(12) United States Patent
Adam

(10) Patent No.: US 10,095,268 B1
(45) Date of Patent: Oct. 9, 2018

(54) DOCKING STATION

(71) Applicant: Todd Adam, Houston, TX (US)

(72) Inventor: Todd Adam, Houston, TX (US)

( * ) Notice: Subject to any disclaimer, the term of this patent is extended or adjusted under 35 U.S.C. 154(b) by 0 days.

(21) Appl. No.: 15/806,731

(22) Filed: Nov. 8, 2017

(51) Int. Cl.
*G06F 1/16* (2006.01)
*G06F 13/38* (2006.01)
*G06F 13/40* (2006.01)

(52) U.S. Cl.
CPC .......... *G06F 1/1632* (2013.01); *G06F 13/385* (2013.01); *G06F 13/4081* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,208,508 B1 * | 3/2001 | Ruch | ...................... | G06F 1/1632 361/679.41 |
| 6,717,798 B2 * | 4/2004 | Bell | ........................ | A47G 1/142 312/223.1 |
| 7,502,225 B2 * | 3/2009 | Solomon | ............... | G06F 1/1632 361/679.41 |
| 8,315,048 B2 * | 11/2012 | Tarnoff | .................. | G06F 1/1626 361/679.4 |
| 8,550,343 B2 * | 10/2013 | Ko | ........................ | G07G 1/0018 235/383 |
| 8,553,408 B2 * | 10/2013 | Supran | .................. | G06F 1/1632 361/679.02 |
| 8,654,522 B2 * | 2/2014 | Ishida | .................. | F16M 11/041 248/346.03 |
| 8,773,850 B2 * | 7/2014 | Minaguchi | ............... | H04N 5/64 361/679.41 |
| 8,907,986 B2 * | 12/2014 | Hunt | ..................... | G06F 1/1626 345/659 |
| RE45,320 E * | 1/2015 | Jaffe | ..................... | G06F 1/1632 361/679.4 |
| 9,189,024 B2 * | 11/2015 | Knutson | ............... | G06F 1/1632 |
| 9,774,135 B2 * | 9/2017 | Laine | .................. | H01R 13/6205 |
| 2003/0072133 A1 * | 4/2003 | Chuang | .................. | G06F 1/1632 361/679.41 |
| 2004/0057199 A1 * | 3/2004 | Azuchi | .................. | G06F 1/1626 361/679.3 |
| 2005/0207112 A1 * | 9/2005 | Bakker | ................. | G06F 1/1632 361/679.41 |
| 2008/0078109 A1 * | 4/2008 | Terleski | ................. | F16M 11/00 40/316 |

(Continued)

*Primary Examiner* — Lisa Lea Edmonds
(74) *Attorney, Agent, or Firm* — Spradley PLLC; Michael Spradley

(57) ABSTRACT

An improved docking station is described herein. The docking station can comprise a first device holder, a base, a plurality of orifices, and a resealable covering. The first device holder can have a slot insertable by a mobile device. The first device holder can comprise a first display opening that can be placed within the front surface of the first device holder. The base can have a chamber that can comprise a USB (Universal Serial bus) hub. The bottom edge of the first device holder can be slantedly attached to the front edge of the base such that the first device holder and the base attached together can form a v-shaped structure. The slot can be accessible through the base. The plurality of orifices can be placed within the outer surface of the docking station. The resealable covering can be capable of closing the inner surface.

12 Claims, 9 Drawing Sheets

(56) References Cited

U.S. PATENT DOCUMENTS

| | | | |
|---|---|---|---|
| 2013/0107136 A1* | 5/2013 | Tamura | H04N 5/64 348/836 |
| 2014/0016799 A1* | 1/2014 | Kumar | H04R 1/04 381/122 |
| 2014/0049904 A1* | 2/2014 | Hume | G06F 1/1632 361/679.41 |
| 2015/0022966 A1* | 1/2015 | Chen | H01R 25/006 361/679.41 |
| 2015/0036283 A1* | 2/2015 | Suckle | G06F 1/1632 361/679.43 |

* cited by examiner

DOCKING STATION

BACKGROUND

This disclosure relates to an improved docking station.

For years, docking station has been designed to allow an individual to connect electronic mobile devices to a charger with ease. One of the most common docking stations is designed with a base wherein said base comprises one or more connectors that protrudes at the top surface of a docking station. The base of the docking station can serve as a stand and an enclosure for the internal components of the docking station, such as cable connectors. Such design allows an individual to easily dock the mobile device on top of the connector to charge it. Although this design provides ease of use, such docking station gives little, or no protection to the mobile device.

Furthermore, other docking stations that provide multiple-dock connectors are oriented such that each mobile device is facing the same direction. Such design can be effective when a single individual is using the multiple-docking station. However in some scenarios, wherein a pair of individual and/or a couple needs to use the multiple-docking station at the same time, such design can be ineffective, and inconvenient. In such example scenario, the couple would either share the same docking station and work side-by-side, or the couple needs to buy a separate docking station, which can be an additional expense to the individuals. As such it would be useful to have an improved docking station.

SUMMARY

An improved docking station is described herein. The docking station can comprise a first device holder, a base, a plurality of orifices, and a resealable covering. The first device holder can have a slot insertable by a mobile device. The first device holder can comprise a first display opening that can be placed within a front surface of the first device holder. The base can have a chamber that can comprise a USB (Universal Serial bus) hub. A bottom edge of the first device holder can be slantedly attached to a front edge of the base such that the first device holder and the base attached together can form a v-shaped structure. The slot can be accessible through the base. The plurality of orifices can be placed within an outer surface of the docking station. a resealable covering can be capable of closing the inner surface.

DETAILED DESCRIPTION

Described herein is an improved docking station. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
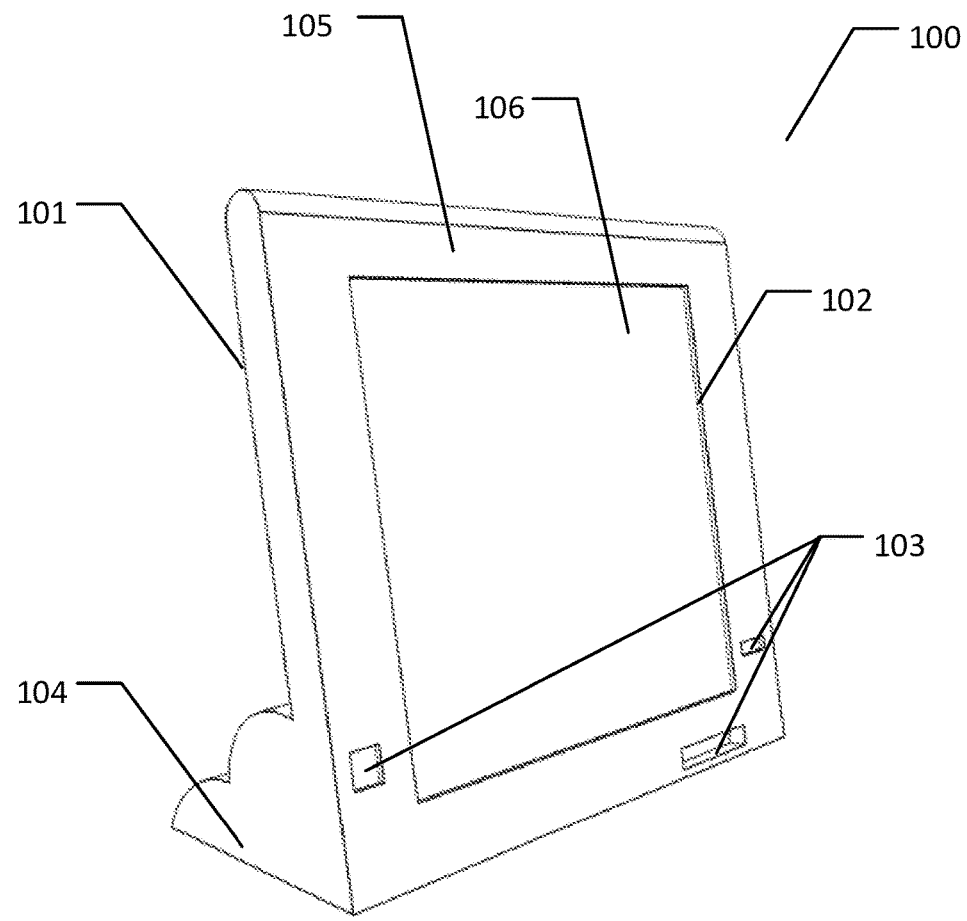
FIG. 1 illustrates a docking station.

FIG. 1 illustrates a docking station 100 comprising a casing 101, a display opening 102, and a plurality of orifices 103. An example of docking station 100 can be an iPad dock station. Casing 101 can enclose and protect internal parts of dock station 100, such as power supply, cables, and/or USB (Universal Serial Bus) hub. Furthermore, casing 101 can serve as a device protector and a device stand while charging a mobile device. Examples of the mobile device can include but is not limited to tablets, iPad, PDA (Personal digital assistant), and mobile phone. Casing 101 can comprise a base 104 and one or more device holders 105. Base 104 can be the bottom portion of casing 101. Base 104 can support device holders 105 at a standing position. Each device holder 105 can enclose the mobile device and can hold mobile device at a slanted position. Display opening 102 can be placed at a front surface of each device holder 105, such that display openings 102 frames around the display screen of a mobile device that can allow screen accessibility. In such structure, the user can directly access the screen of his mobile device. In another embodiment, display openings 102 can comprise a screen protector 106. In this embodiment, screen protector 106 can be used to cover display openings 102 to prevent scratches and/or smudges on a mobile device. Screen protector 106 can be made of durable material that can include but is not limited to tempered glass, and plastic material such as PET (polyethylene terephthalate) and TPU (thermoplastic polyurethane). Orifices 103 can be small openings within casing 101. Further in one embodiment, display opening 102 can be in a portrait orientation. In other embodiments, display opening 102 can be in a landscape orientation.

Figure 2:
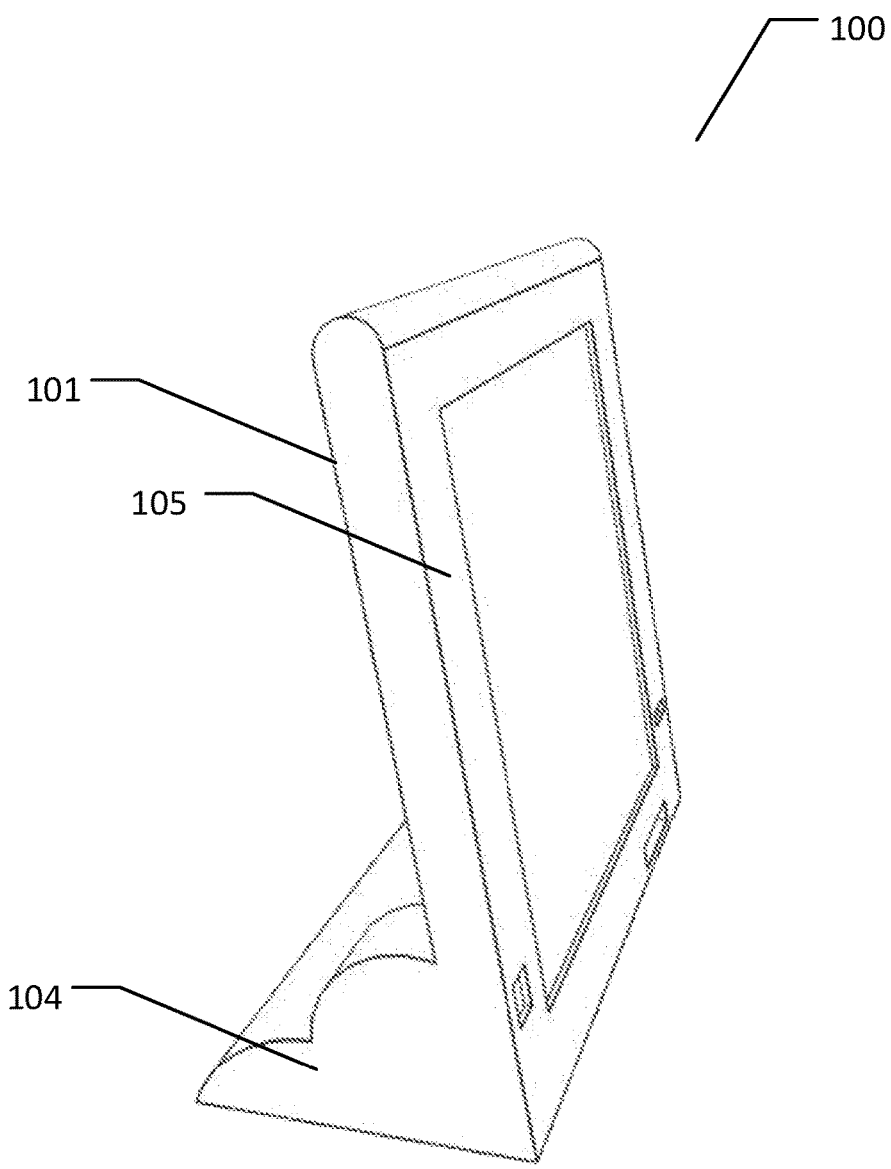
FIG. 2 illustrates an embodiment of a casing comprising a single device holder.

FIG. 2 illustrates an embodiment of casing 101 comprising a single device holder 105. In this embodiment, the bottom portion of device holder 105 can be slantedly attached to a front edge of base 104 through a pair of cylindrical portion 201. Each cylindrical portion 201 can be placed at the opposite backside of single device holder 105.

Figure 3:
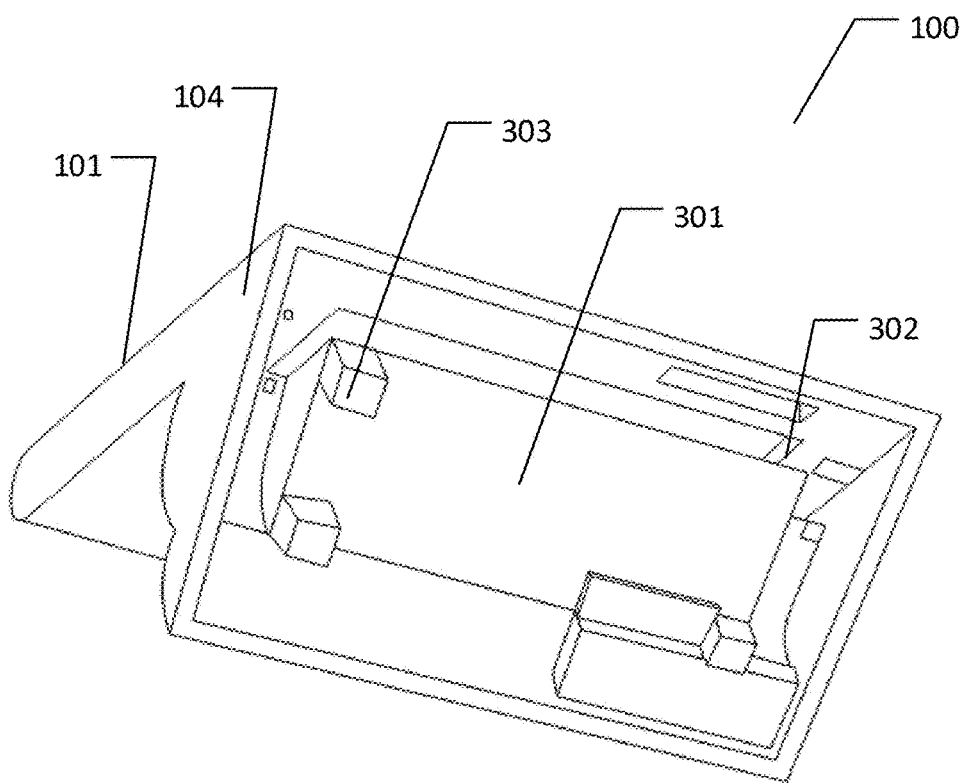
FIG. 3 illustrates the bottom view of a casing.

FIG. 3 illustrates the bottom view of casing 101. The internal portion of base 104 can comprise a chamber 301, and a slot 302. Chamber 301 can be a space within base 104, which can house a USB hub. Chamber 301 can comprise a plurality of guides 303. In this embodiment, guides 303 can be positioned within the inner top surface of chamber 301. Guides 303 can secure the USB hub in place. Slot 302 can be an opening at a surface of docking station 100 that is insertable by the mobile device. As an example embodiment, slot 302 can be at the bottom surface of casing 101. In some embodiments, slot 302 can be placed at the top of casing 101, or at the sides of casing 101.

Figure 4:
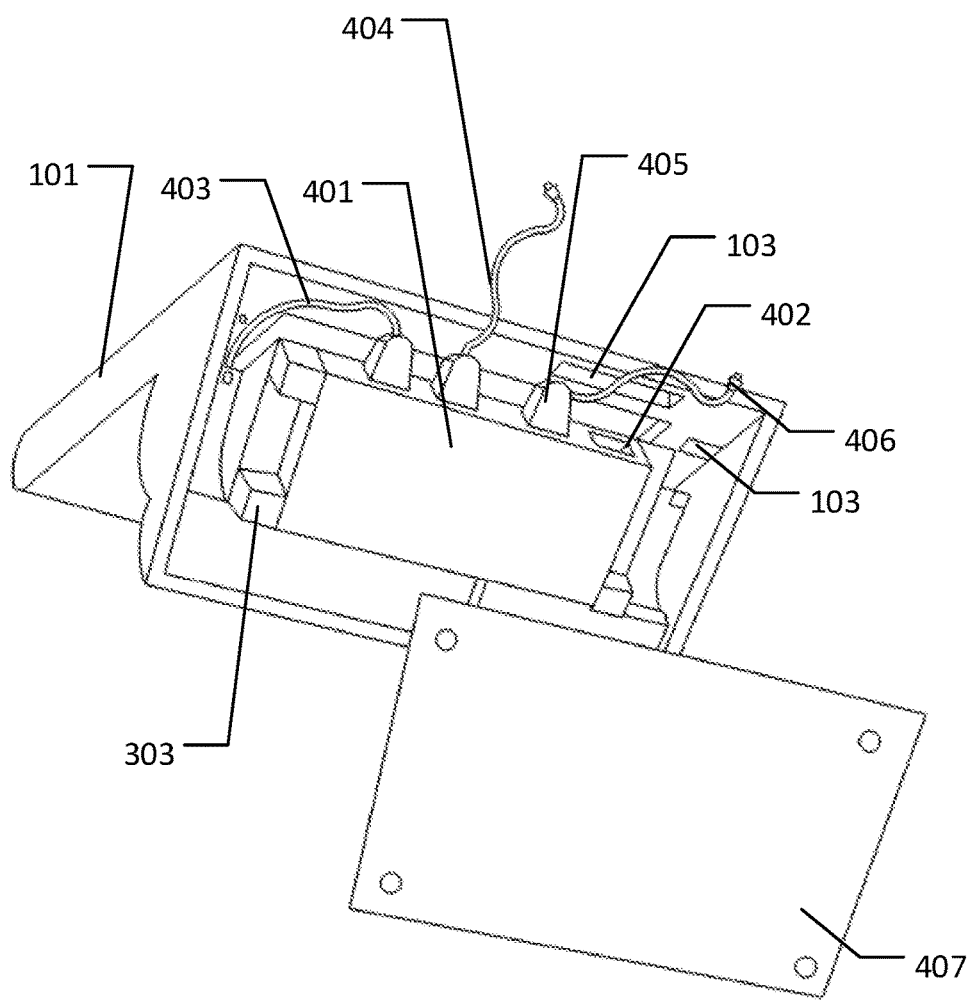
FIG. 4 illustrates a USB (Universal Serial Bus) hub placed in a chamber.

FIG. 4 illustrates a USB hub 401 placed in chamber 301. USB hub 401 can comprise a plurality of ports 402 and a power adapter 403. In one embodiment, USB hub 401 can be capable of providing power to ports 402 through power adapter 403. In another embodiment, USB hub 401 can be a self-powered hub, which can comprise a rechargeable battery. In such embodiment, USB hub 401 can be recharged through power adapter 403. Further in one embodiment, USB hub 301 can be a USB 2.0 powered hub. In another embodiment, USB hub 301 can be a USB 3.0 powered hub. Further in one embodiment, USB hub 401 can be a self-powered hub. Ports 402 can be connectable to a plurality of cable connectors 404. Each cable connector 404 can comprise a first end 405 and a second end 406. First end 405 of each cable connector 404 can be a standard USB cable connector. Second end 406 of each charger cable 303 can be different type of connectors, which can include but is not limited to USB connector, micro-USB connector, mini-USB B plug, and/or lightning connector.

As an example embodiment, USB hub 401 can be mounted into base 104 wherein ports 402 can be facing the front surface of docking station 100. In such structure, first end 405 can be connected to USB hub 401, while the second end 406 can be loose and can be positioned anywhere within the inner section of casing 101. Furthermore, the inner section of base 104 can be concealed and protected through covering 407. In this embodiment, covering 407 can comprise a flat surface that fits snugly at the bottom of casing 101.

Figure 5:
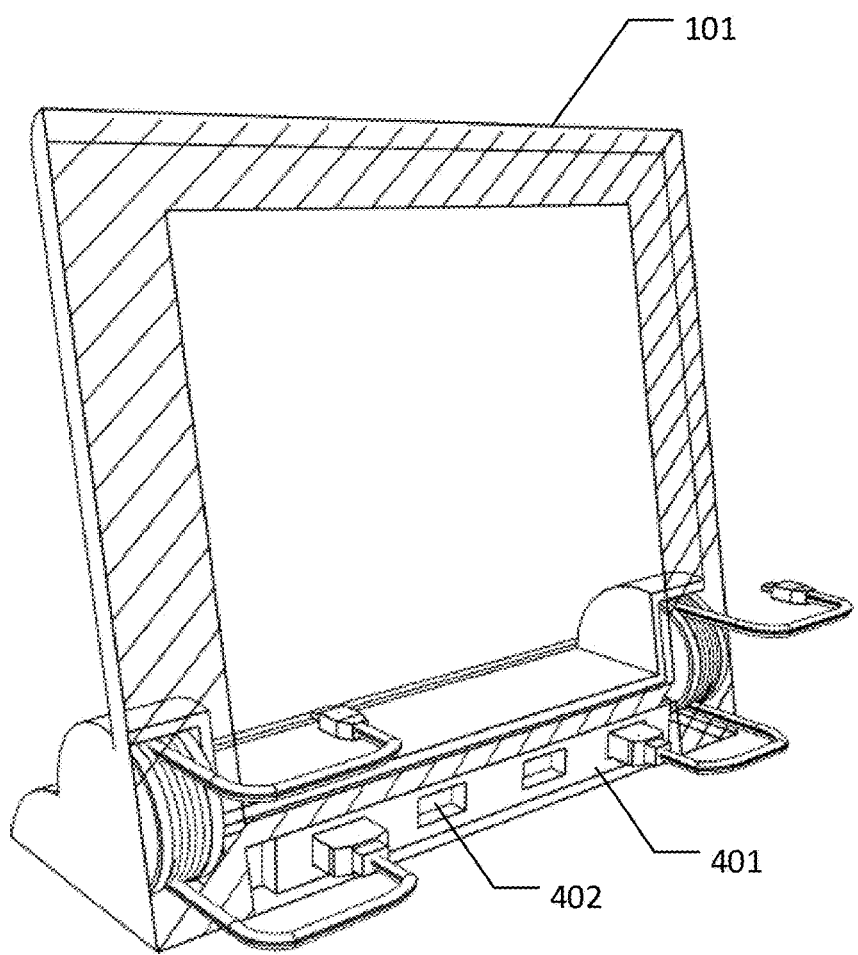
FIG. 5 illustrates a sectional view of a casing.

FIG. 5 illustrates a sectional view of casing 101 comprising a plurality of cord reels 501. Cord reels 501 can be retractable cord reels that are capable of extending and retracting cable connectors 404. Each cord reel 501 can be mounted within each cylindrical portion 201. In such structure, each first end 405 can connect to each port 402 while the middle cord portion of each cable connector 404 can be winded onto each cord reels 501. This can allow each second end 406 be placed within each orifices 103 on casing 101.

Figure 6:
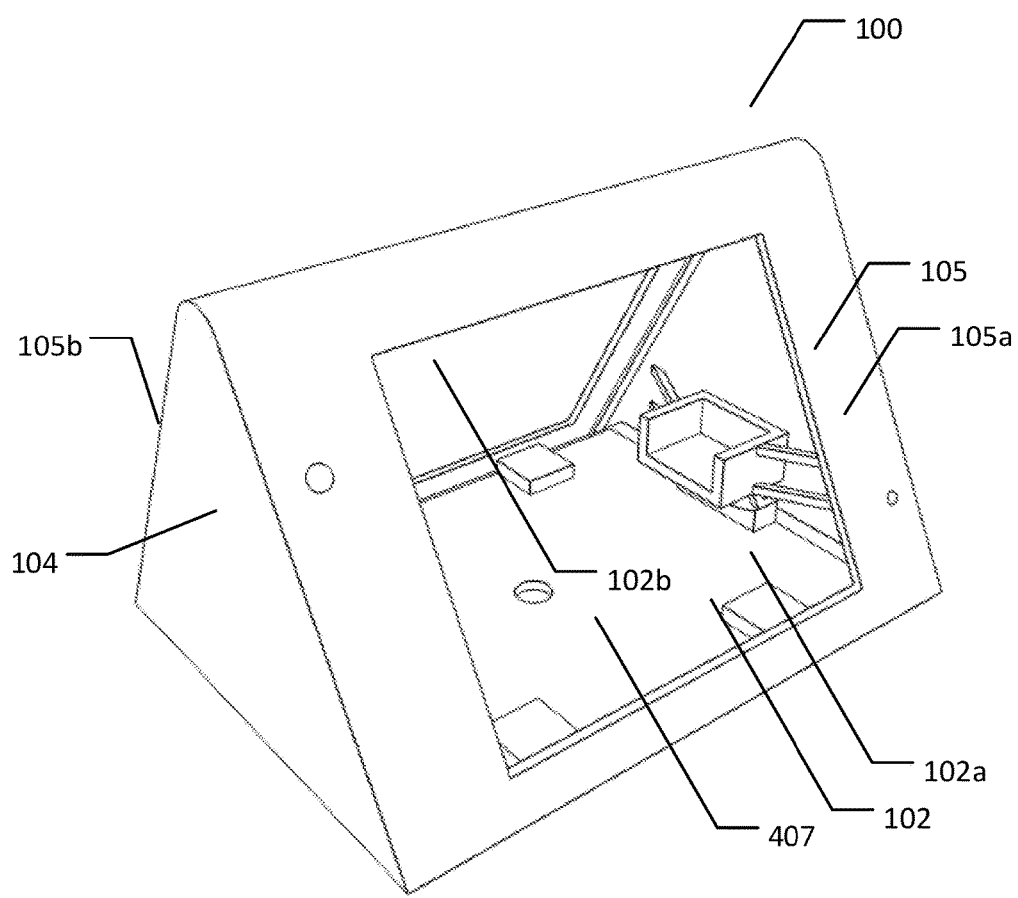
FIG. 6 illustrates a pyramidal embodiment of a casing.

FIG. 6 illustrates a pyramidal embodiment of casing 101. In this embodiment, docking station 100 can comprise device holders 105, a first device holder 105a and a second device holder 105b, placed at the opposite side of casing 101, guides 303, and covering 407. First device holder 105a can comprise a first device opening 102a and second device holder 105b can comprise a second device opening 102b. In such embodiment, the top edge of each device holder 105 can attach together within a 90-degree angle, while the bottom edge of each device holder 105 can connect at the bottom edge portions of base 104. When sealed through coverings 407, such structure can form a pyramidal enclosure for the internal components of dock station 100.

Figure 7:
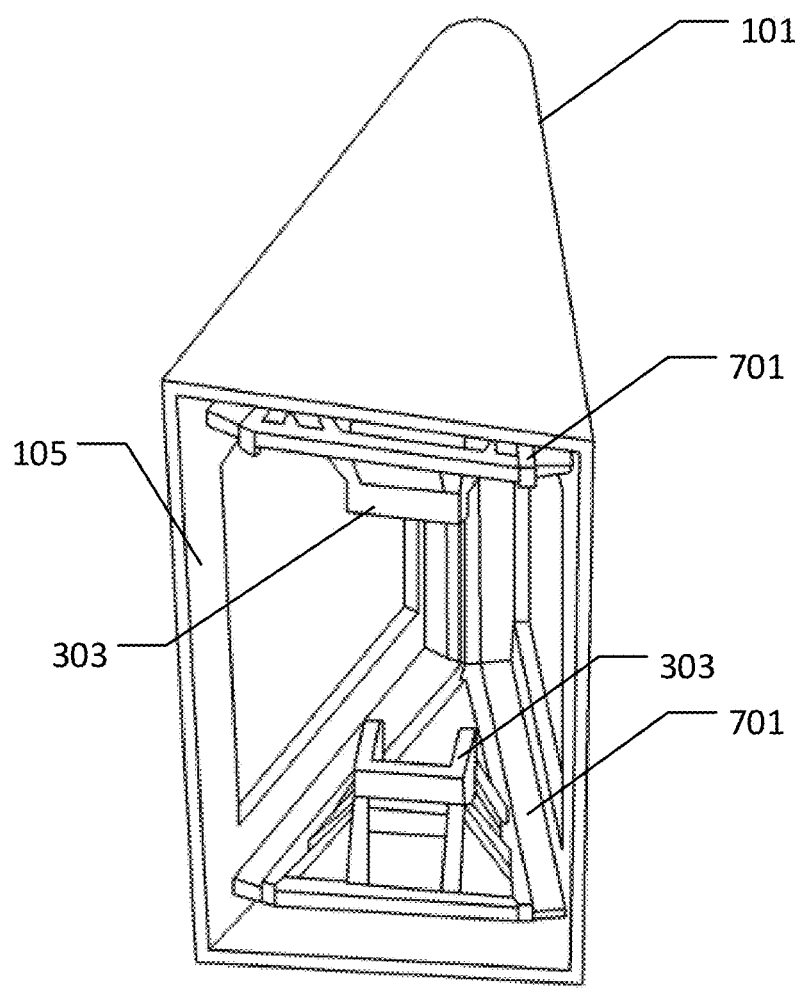
FIG. 7 illustrates a bottom view of a pyramidal embodiment of a casing.

FIG. 7 illustrates a bottom view of a pyramidal embodiment of casing 101. In this embodiment, each device holder 105 can comprise a pair of tracks 701, and guides 303. Tracks 701 can be placed within the inner surface of each device holder 105. Each track 701 can vertically attach at the opposite side of each device holder 105. Tracks 701 can allow the mobile devices be slidably insertable within casing 101. Furthermore, tracks 701 can securely hold the mobile devices at a slanted position within casing 101. Guides 303 can be placed in between device holders 105. In such embodiment, guides 303 can be U-shape in form that is capable of holding USB hub 401 in a vertical position.

Figure 8:
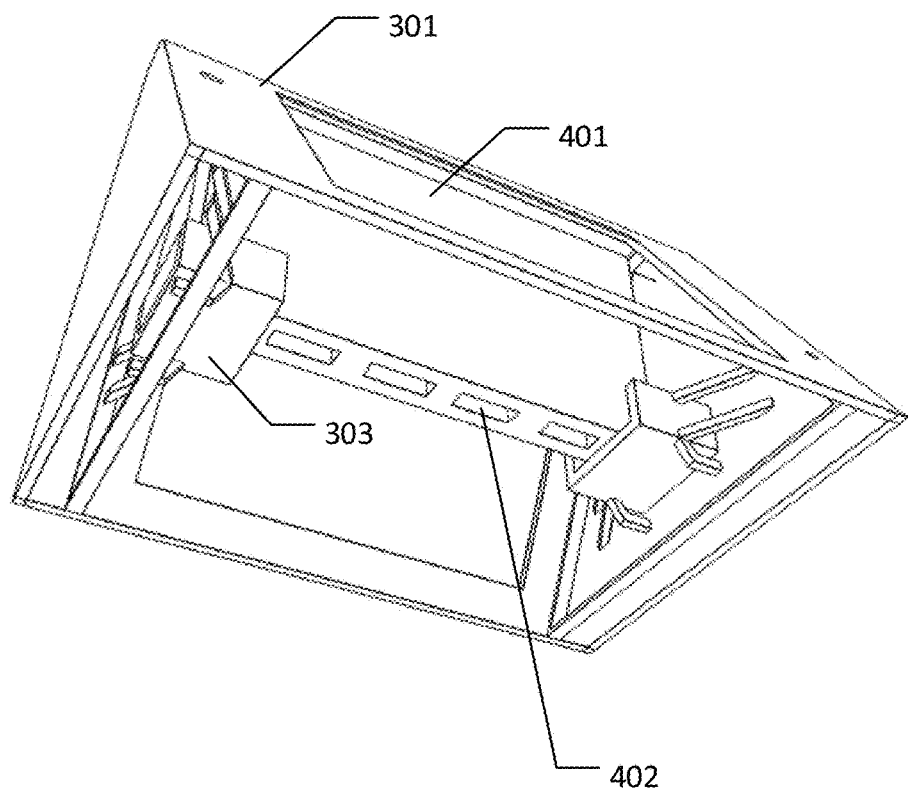
FIG. 8 illustrates a USB hub mounted within a pair of tracks.

FIG. 8 illustrates USB hub 401 mounted within tracks 701. In one embodiment, the side of USB hub 401 that comprises ports 402 can be positioned facing the bottom surface of casing 101. This can allow cable connectors 404 positionable within the inner section of casing 101.

Figure 9:
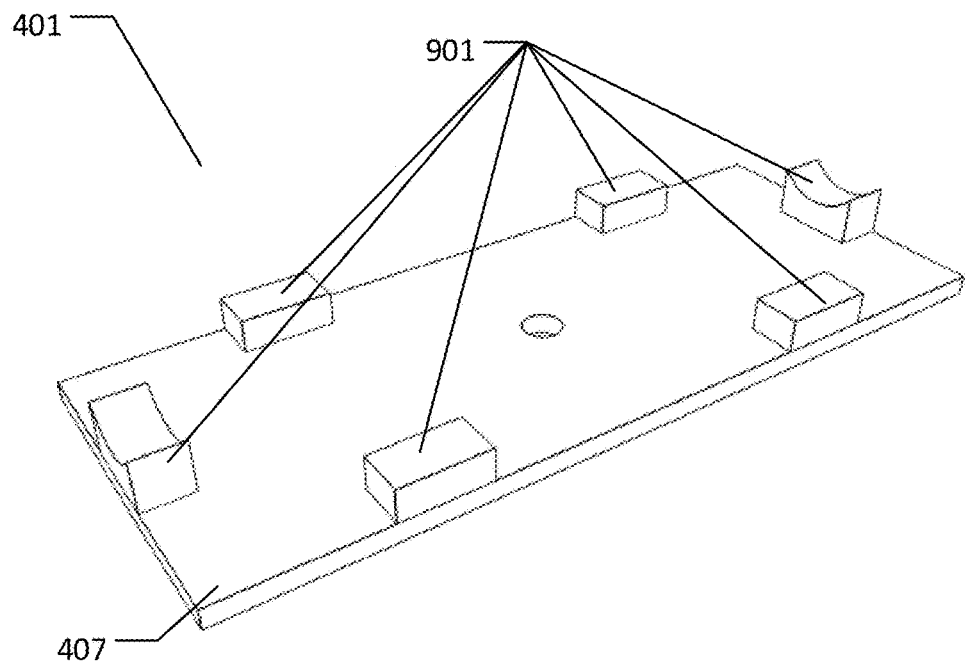
FIG. 9 illustrates an embodiment of a covering.

FIG. 9 illustrates an embodiment of covering 407. In this embodiment, covering 407 can further comprise a plurality of stoppers 901. Stoppers 901 can prevent mobile devices and USB hub 401 from slipping out of place within casing 100. As such, stoppers 901 can be placed along the top surface near the edges of covering 407 to prevent mobile devices from slipping at the bottom of casing 101.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A docking station comprising
a first device holder having a slot insertable by a mobile device, said first device holder comprising a first display opening placed within the front surface of said first device holder;
a base having a chamber comprising a USB (Universal Serial bus) hub, further wherein the bottom edge of said first device holder is slantedly attached to the front edge of said base such that said first device holder and said base attached together forms a v-shaped structure, further wherein said slot accessible through said base;
a plurality of orifices placed within the outer surface of said docking station; and
a resealable covering capable of closing said inner surface.

2. The docking station of claim 1 wherein said chamber further comprises a plurality of guides, said plurality of guides capable of securing said USB hub within said chamber.

3. The docking station of claim 2 wherein said guides are capable of securing said USB hub at a horizontal position.

4. The docking station of claim 1 wherein said guides are capable of securing said USB hub at a horizontal position.

5. The docking station of claim 1 wherein said first display opening can comprise a screen protector.

6. The docking station of claim 3 wherein said screen protector can comprise a PET (polyethylene terephthalate) material.

7. The docking station of claim 3 wherein said screen protector can comprise a TPU (thermoplastic polyurethane) material.

8. The docking station of claim 1 further comprising a second device holder attached to the opposite side of said first device holder at an angle forming a pyramidal structure, further wherein said second device holder comprising a second display opening within the front surface of said second device holder, wherein said second display opening is facing towards the opposite direction of said first display opening; and a second slot insertable by another mobile device.

9. The docking station of claim 8 wherein the top edge of said first device holder attaches to the top edge of said second device holder at a 90 degrees angle.

10. The docking station of claim 8 wherein said second display opening can comprise a screen protector.

11. The docking station of claim 10 wherein said screen protector can comprise a PET (polyethylene terephthalate) material.

12. The docking station of claim 10 wherein said screen protector can comprise a TPU (thermoplastic polyurethane) material.

* * * * *